United States Patent [19]

Krause et al.

[11] Patent Number: 4,473,538

[45] Date of Patent: Sep. 25, 1984

[54] PROCESS FOR REMOVING MOLTEN PHOSPHORUS PENTSULFIDE FROM A REACTOR

[75] Inventors: Johannes Krause, Hürth-Hermülheim; Franz Mainzer, Hürth; Günter Reichert, Bornheim-Merten; Hermann Niermann, Erftstadt, all of Fed. Rep. of Germany

[73] Assignee: Hoechst Aktiengesellschaft, Fed. Rep. of Germany

[21] Appl. No.: 487,998

[22] Filed: Apr. 29, 1983

Related U.S. Application Data

[63] Continuation of Ser. No. 381,549, May 24, 1982, abandoned, which is a continuation of Ser. No. 214,426, Dec. 8, 1980, abandoned, which is a continuation of Ser. No. 32,554, Apr. 23, 1979, abandoned.

[30] Foreign Application Priority Data

Apr. 27, 1978 [DE] Fed. Rep. of Germany ....... 2818422

[51] Int. Cl.³ ............................................. C01B 25/14
[52] U.S. Cl. .................................... 423/303; 422/129
[58] Field of Search ........................................ 423/303

[56] References Cited

U.S. PATENT DOCUMENTS

| | | | |
|---|---|---|---|
| 3,023,086 | 2/1962 | Robota | 423/303 |
| 3,146,069 | 8/1964 | Robota | 423/303 |
| 3,183,062 | 5/1965 | Taylor | 423/303 |
| 3,342,552 | 9/1967 | Niermann et al. | 423/303 |

*Primary Examiner*—Gary P. Straub
*Assistant Examiner*—Wayne A. Langel
*Attorney, Agent, or Firm*—Connolly and Hutz

[57] ABSTRACT

The invention provides a process and an apparatus for removing molten phosphorus pentasulfide, via an overflow, from a reactor, wherein phosphorus is reacted with sulfur at temperatures higher than 300° C.

To this end, the reactor is supplied with phosphorus and sulfur from dosing vessels which are given the dimensions necessary (a) to receive the quantity of phosphorus and sulfur, respectively, which are required to produce phosphorus pentasulfide with a preselected quantitative ratio of P:S, (b) to provide a total filling volume corresponding to that of a $P_2S_5$-receiving tank. The quantity of the phosphorus and sulfur feed materials in the respective dosing vessels is in each case fully emptied into the reactor and a corresponding quantity of molten $P_2S_5$ is simultaneously discharged directly from the reactor, via the overflow, into the respective $P_2S_5$-receiving tank, whose filling volume exactly corresponds, to that of the dosing vessels.

2 Claims, 1 Drawing Figure

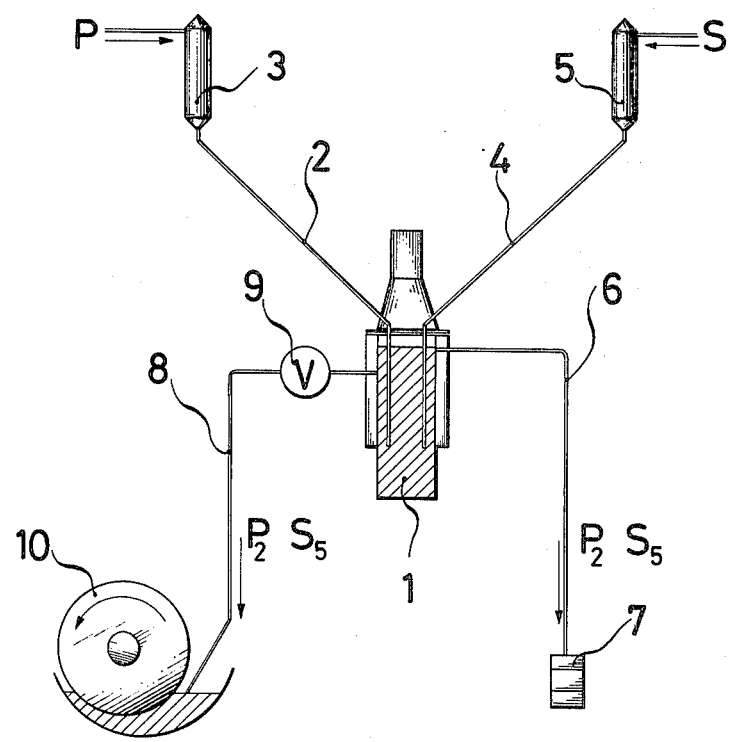

PROCESS FOR REMOVING MOLTEN PHOSPHORUS PENTSULFIDE FROM A REACTOR

This application is a continuation of application Ser. No. 381,549 filed May 24, 1982 abandoned, which was a continuation of application Ser. No. 214,426 filed Dec. 8, 1980 abandoned, which was a continuation of application Ser. No. 32,554 filed Apr. 23, 1979 abandoned.

The present invention relates to a process and apparatus for removing molten phosphorus pentasulfide, via an overflow, from a reactor in which phosphorus is reacted with sulfur at temperatures higher than 300° C., the phosphorus and sulfur starting materials being introduced into the reactor from dosing vessels which are alternately filled and emptied and have defined filling volumes.

A process for making phosphorus pentasulfide by reacting phosphorus with sulfur has already been described in German patent specification No. 1 195 282.

In this process, use is made of reservoirs with defined filling volumes which are alternately filled and emptied into the reactor.

By cooling, the reaction mixture is maintained at temperatures within the range about 350° to 480° C., and the starting materials are preferentially introduced into the bottom, i.e. base portion, of the reactor. The resulting reaction product is taken from the reactor via an overflow and delivered to an intermediate reservoir. This latter is provided with a valved bottom outlet permitting the phosphorus pentasulfide to be delivered to a rotating plate and from there to the respective processing station.

This method of discharging $P_2S_5$ from the reactor is not fully satisfactory inasmuch as molten $P_2S_5$ is known to be self-ignitable in the open air.

Since $P_2S_5$ may be injurious to the health of the operating personnel, it is hazardous for it to be stored in an intermediate reservoir, even if maintained under nitrogen therein.

In addition to this, $P_2S_5$ is liable to run out from the reservoir whenever the latter or its valved structural parts are or become leaky. It is therefore an object of the present invention to provide a process which avoids the adverse effects described hereinabove.

The present invention provides more particularly a process for removing molten phosphorus pentasulfide, via an overflow, from a reactor, in which phosphorus is reacted with sulfur at temperatures higher than 300° C., the phosphorus and sulfur feed materials being introduced into the reactor from dosing vessels which are alternately filled and emptied and have defined filling volumes, which comprises: supplying the reactor with the said feed materials from dosing vessels which are given the dimensions necessary (a) to receive the quantity of phosphorus and sulfur, respectively, which are required to produce phosphorus pentasulfide with a preselected quantitative ratio of P to S, and (b) to provide a total filling volume corresponding to that of a $P_2S_5$-receiving tank, the quantity of feed material in the respective dosing vessel being in each case fully emptied into the reactor and a corresponding quantity of molten $P_2S_5$ being simultaneously discharged directly from the reactor, via an overflow, into the respective $P_2S_5$-receiving tank, whose filling volume exactly corresponds to that of the dosing vessels.

The dosing vessels should more preferably be given the dimensions necessary to provide for a quantitative ratio of P:S of 27:73 to 29:71 therein.

The process of the present invention compares favorably with the prior art methods in respect of the following points: The quantity of molten $P_2S_5$ which is taken from the reactor and directly introduced into the $P_2S_5$-receiving tanks can be controlled with the same great accuracy with which the dosing vessels receiving the two feed materials can be filled, so that it is possible for the sum of the filling volumes of the two dosing vessels to be fairly accurately conformed to the filling volume of the $P_2S_5$-receiving tanks.

This is more particularly of importance in all those cases in which the $P_2S_5$-melt is permitted to solidify in the tanks to give so-called "cast material", which is ultimately dispatched.

Last but not least, the present process substantially avoids the need to store appreciable quantities of readily combustible $P_2S_5$ in intermediary valved containers from which it may run out in uncontrolled manner.

BRIEF DESCRIPTION OF THE DRAWING

The sole figure of the Drawing is a schematic representation of an apparatus useful for carrying out the process of this invention, shown partly in cross-section.

DETAILED DESCRIPTION OF THE DRAWING

The present invention also provides for an apparatus for carrying out the present process. The apparatus, of which an exemplary form is shown diagrammatically in the accompanying drawing, comprises a reactor 1 fitted with an overflow 6, a first feed pipe 2 running to a phosphorus dosing vessel 3, and a second feed pipe 4 running to a sulfur dosing vessel 5, the reactor 1 being directly connected through the overflow 6 to a $P_2S_5$-receiving tank 7.

The reactor 1 may also comprise a tubular outlet 8 valved as shown at 9, running to a cooling cylinder 10, the tubular outlet 8 being preferably arranged at a level lower than the overflow 6.

By opening the valve 9, which is normally kept closed, it is possible directly to deliver molten $P_2S_5$ to the cooling cylinder whenever it is necessary, e.g. in the event of a breakdown affecting the production facility, or whenever it is desirable to produce scaly material within short time limits.

The apparatus of the present invention can be reliably and safely operated even in the event that valve 9 should be leaky as outflowing melt readily solidifies on the cooling cylinder 10 and then naturally ceases to be self-ignitable. The dosing vessels 3 and 5 should preferably be given the dimensions necessary (a) to receive the quantity of phosphorus and sulfur, respectively, which is required to produce $P_2S_5$ with a preselected P:S-ratio and (b) to have together a volume corresponding to the filling volume of the $P_2S_5$-receiving tank 7.

In this manner, it is possible accurately to control the quantity of reaction product which is taken from the reactor and to control, from the filling station, the introduction of the feed materials into the reactor and the quantity of reaction product emptied into the receiving tank.

The following Example illustrates the invention which is, however, not limited thereto:

EXAMPLE 27.5 kg of molten phosphorus coming from dosing vessel 2 and 72.5 kg of molten sulfur coming from dosing vessel 5 were introduced through feed pipes 2 and 4, respectively, into the base portion of reactor 1, which was filled, up to the level of overflow 6, with a $P_2S_5$-melt which had a temperature of 350° C. In this way, a quantity of molten $P_2S_5$, corresponding to the quantity of feed material supplied, was caused to run through the overflow 6 into the $P_2S_5$-receiving tank 7.

The two dosing vessels 3 and 5 as well as the feed pipes 2 and 4 and the overflow 6 were heated so as to maintain the various materials in the liquid state. After the melt had solidified, the receiving tank 7 contained 99.8 kg of $P_2S_5$ with 27.5 weight % of P and 72.4 weight % of S.

We claim:

1. In the process for removing molten phosphorus pentasulfide, via an overflow, from a reactor, wherein phosphorus is reacted with sulfur at temperatures higher than 300° C., the phosphorus and sulfur feed materials being introduced into the reactor from dosing vessels which are alternately filled and emptied and have defined filling volumes, the improvement which comprises: discharging directly the molten phosphorus pentasulfide via the overflow from the reactor into a $P_2S_5$-receiving tank serving ultimately as a dispatching container whose filling volume exactly corresponds to that of the dosing vessels which are given the dimensions necessary (a) to receive the quantity of phosphorus and sulfur, respectively, which are required to produce phosphorus pentasulfide with a preselected quantitative ratio of P:S, and (b) to provide a total filling volume corresponding to that of a $P_2S_5$-receiving tank, supplying the reactor with the said feed materials by filling and emptying the dosing vessels, a corresponding volume of molten $P_2S_5$ being discharged simultaneously from the reactor into the receiving tank, and allowing the molten phosphorus pentasulfide to solidify therein; and providing the reactor with a tubular outlet arranged at a level lower than the overflow, which outlet can be normally closed off but can be opened in the event that it becomes necessary to cool the contents of the reactor more quickly than the cooling which takes place in the receiving tank, said tubular outlet, when open, communicating with a cooling cylinder for cooling and solidifying $P_2S_5$.

2. The process as claimed in claim 1, wherein the dosing vessels are given the dimensions necessary to provide for a P:S-ratio of 27:73 to 29:71 therein.

* * * * *